UNITED STATES PATENT OFFICE.

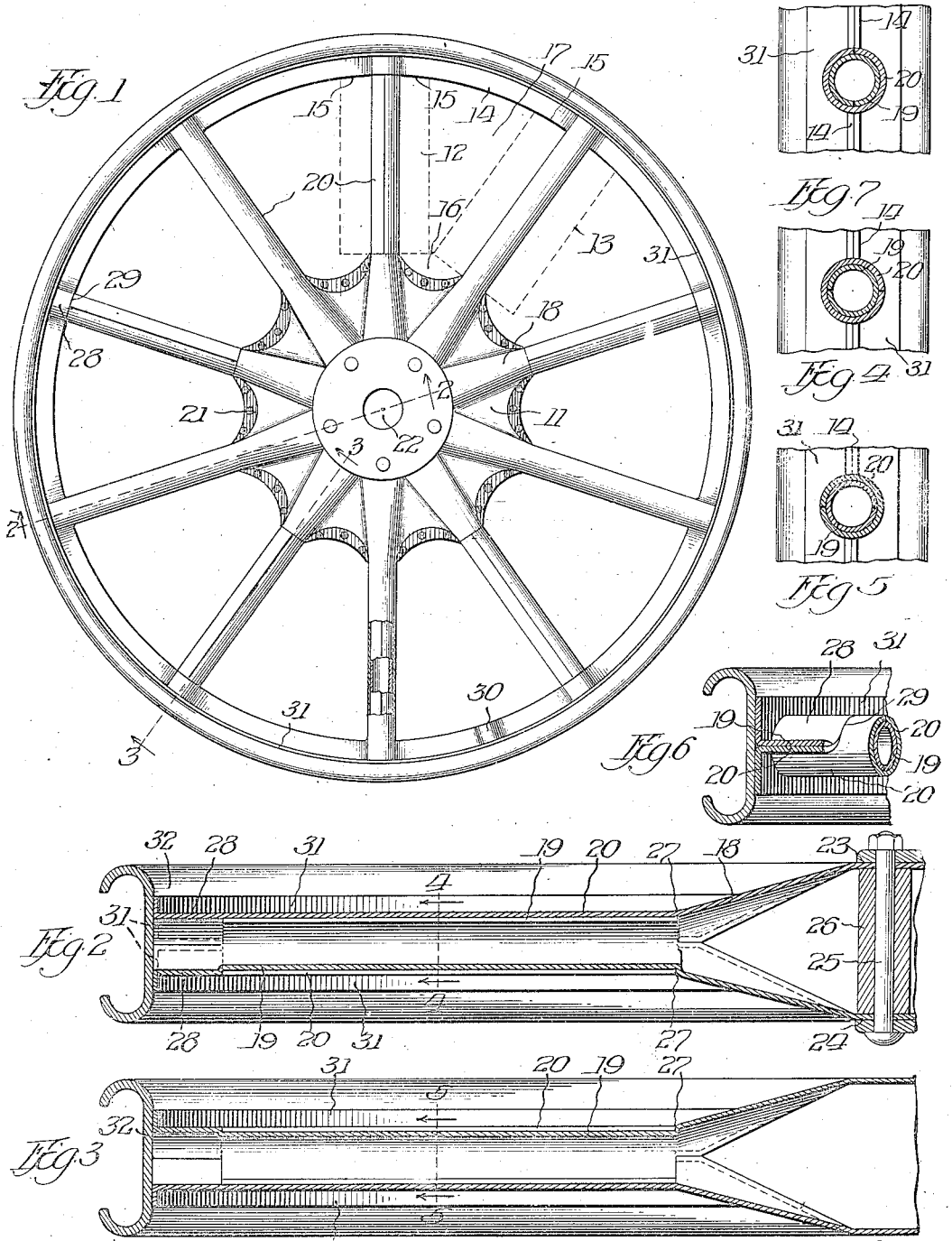

LEWIS T. GREIST, OF CHICAGO, ILLINOIS, ASSIGNOR TO FORSYTH BROTHERS COMPANY, OF CHICAGO, ILLINOIS, A CORPORATION OF ILLINOIS.

VEHICLE-WHEEL.

1,256,788.

Specification of Letters Patent. Patented Feb. 19, 1918.

Application filed November 28, 1913. Serial No. 803,461.

*To all whom it may concern:*

Be it known that I, LEWIS T. GREIST, a citizen of the United States, residing at Chicago, in the county of Cook and State of Illinois, have invented certain new and useful Improvements in Vehicle-Wheels, of which the following is a specification.

The invention relates to pressed metal wheels and particularly of that general type wherein two similar halves, each comprising central hub and radial spoke portions, are placed side by side in opposition with the spoke members of one-half overlapping the corresponding spoke members of the other half, the halves being secured together to form a complete wheel.

In the manufacture of such wheels as heretofore constructed it has been necessary to form the two halves in different dies by reason of the fact that the inner spoke has of necessity a smaller diameter than the outer enveloping spoke and consequently requires a narrower strip of material extending from the hub portion; or, if, alternatively, the same die is used the two edges of the material forming the outer spoke do not meet and a space is left extending longitudinally of the spoke surfaces, which is unsightly and weakening. In order to render the unsightly gap on the spoke less conspicuous it has been customary to locate it on the inside of the completed wheel, all of the spokes of one-half lying inside the spokes of the other half, but this necessarily results in a wheel which possesses unequal powers of resistance to lateral strains from the two directions.

By my invention I provide for an absolutely symmetrical wheel, the two halves and also the two sides of the completed wheel being identical in appearance and in power of resistance to lateral stresses, by blanking and pressing the halves in the same dies and in such manner as to adapt each alternate spoke of one-half to lie within the corresponding alternate spoke of the other half, the provision of alternate narrow and wide strips of material radiating from the center of each half enabling the edges of the outer spokes to abut and permitting of a welded connection therebetween.

Other details of improved construction which will hereinafter be made manifest constitute of the improved wheel a decided advance in this art from the standpoints of strength, neatness and low cost of manufacture.

In order that the invention may be readily understood a preferred embodiment of the same is set forth in the accompanying drawing and in the following detailed description based thereon. As, however, the invention is susceptible of embodiment in other and varied constructional forms the drawing and description are to be construed in an illustrative sense and not as unnecessarily limiting the invention as particularly set forth in the claims. In the drawing—

Figure 1 is a side elevation of a completed wheel with certain portions broken away to reveal the interior construction;

Fig. 2 is a section on an enlarged scale taken on the line 2—2 of Fig. 1;

Fig. 3 is a similar section taken on the line 3—3 of Fig. 1;

Figs. 4 and 5 are sections taken respectively on the lines 4—4 and 5—5 of Figs. 2 and 3;

Fig. 6 is a fragmentary perspective view showing the construction of the outer spoke ends; and Fig. 7 is a section similar to Figs. 4 and 5 but through a slightly modified form of construction.

The wheel as illustrated is manufactured by punching and pressing from two circular blanks of sheet steel which are punched to provide a central disk portion 11 with integral strips 12 and 13 extending radially therefrom, the strips being connected at their outer ends by a peripheral web 14. The narrow strips 12 alternate with the wider strips 13 and both sets of strips are left integral with the central disk and the peripheral web in their medial portions only, the punching operation slitting the metal at 15 and blanking out the triangular pieces 16 and 17 so as to leave the marginal portions of each strip free along the dotted lines of Fig. 1. By the pressing operation the disk portion 11 is outwardly dished and also provided with radiating semi-tubular ribs or channels 18 which extend from the central portion of the disk radially, and the semi-tubular formation of which continues along the medial line of the strips and including the web. The free marginal portions of the narrower strips are further folded over to form tubular spokes 19 with the edges of the strips in abutment one with the other.

The two halves of the wheel thus formed having alternate tubular spokes with intervening incompletely formed spokes are disposed side by side in opposition with the tubular spokes lying within the incompletely formed spokes and thereafter the marginal portions of the incompletely formed spokes are folded inward so as to envelop the inner spokes, themselves forming the outer spokes 20, and the edges of the disks between the spokes are united as indicated at 21 by welding or any other approved manner. The usual hub is then inserted through the central opening 22 and the hub plates 23 and 24 are connected by a series of bolts 25 extending through the wheel and through spacing spools 26 which prevent collapsing of the disks.

By the pressing operation each of the smaller spokes, at the point where it merges with its rib 18, is slightly offset inwardly so as to provide an outwardly facing shoulder 27 to permit the outer spokes to envelop the same and to abut radially against said shoulder. The depth of the shoulder is such as to accommodate the thickness of the metal of the outer spoke without the latter projecting above the general surface of the disk and provide a substantially flush joint.

The half round channels 28 formed in the web as continuations of each spoke are all of the same exterior dimensions, corresponding to the exterior dimensions of the outer spokes. It follows that the said channeled portion of the web which forms the outer continuation of each inner spoke is larger than the spoke proper the surface being offset a distance corresponding to the thickness of the metal and thus forming a shoulder against which the end of the enveloping outer spoke will abut so that the outer surface of the spoke and of the channeled portion of the web will form a flush joint at 29 one with the other.

During the pressing operation the metal of the web midway between two adjacent spokes is deflected upwardly to form a semitubular projection 30, which, when the two halves of the wheel are placed together with the larger spokes of one-half coinciding with the smaller spokes of the other half, the two channel projections 30 will come into register and form a valve tube.

The web 14 of each of the halves is flanged at a right angle as indicated at 31 so that when the two halves are joined as stated the two flanges 31 provide an outer flat periphery to the wheel serving as a felly upon which the rim 32 is mounted and suitably secured as by welding.

It will thus be observed that the completed wheel comprises two identical halves having spoke members formed integral with the central hub portion and the peripheral flanged web, the alternate spokes of each half being smaller than the intervening spokes and the smaller spokes of one member enveloped by the larger spokes of the other member so that the lines of juncture of the metal forming the spokes are alternately upon the opposite faces of successive spokes. It will also be seen that by the provision of offsets at the two ends of the spokes where they merge respectively into the peripheral web and the channels of the disk a flush surface is provided and also an abutment for the enveloping spoke portion so that in the finished wheel no line of demarcation is observable.

Instead of blanking the metal so as to provide overhanging marginal portions of the same width on each side of a line connecting the web and disk the overhang may be mostly on one side so that when the metal is folded to form the tubular spoke the line of junction between the edges thereof will be in the plane of the wheel instead of in the plane of the axle, as indicated in Fig. 7. So constructed the sides of the spokes on both faces of the wheel will be unbroken by a longitudinal line of junction.

From the foregoing it will be evident that a wheel is provided both the members of which may be made with the same dies thus reducing the cost of manufacture and that by reason of the flush connections between the overlapping metal portions of the spokes and their connections both sides of the wheel are not disfigured by unsightly irregularities of surface. Moreover, the provision of shoulders forms radial abutments for the spoke portions and thus adds greatly to the strength of the wheel against radially applied stresses and the abutment of the longitudinal edges of the metal from which the spoke is formed also increases the resistance of the wheel to lateral stresses. The continuation of the spokes through the peripheral web 14 to an abutment against the flange 31 stiffens the wheel as distinguished from a spoke terminating with and supported only by the web.

I claim:

1. A pressed metal wheel composed of similar halves each including a hub portion and spoke members bent to tubular form, the alternate spokes of one-half respectively enveloping and being enveloped by the corresponding alternate spokes of the other half, substantially as described.

2. A pressed metal wheel composed of similar halves each including a hub portion and spoke members formed integral therewith and bent to tubular form, the alternate spokes of one-half respectively enveloping and being enveloped by the corresponding alternate spokes of the other half, substantially as described.

3. A pressed metal wheel composed of similar halves each including a hub portion, a peripheral web, and spokes formed integral therewith and bent to tubular form, the alternate spokes of one-half respectively enveloping and being enveloped by the corresponding alternate spokes of the other half, substantially as described.

4. A pressed metal wheel composed of similar halves each including a hub portion, a peripheral web, and spokes formed integral therewith and bent to tubular form, the alternate spokes of one-half respectively enveloping and being enveloped by the corresponding alternate spokes of the other half, the line of juncture between the edges of the inner and outer spokes being diametrically opposed, substantially as described.

5. A pressed metal wheel comprising two similar halves of sheet metal each consisting of a centrally apertured disk with radial ribs, and tubular spokes extending outwardly from the disk as continuations of the ribs, the alternate tubular spokes of one-half respectively closely fitting within and without the alternate corresponding spokes of the other half, substantially as described.

6. A pressed metal wheel comprising two similar halves of sheet metal each consisting of a centrally apertured disk with radial ribs, tubular spokes extending outwardly from the disk as continuations of the ribs, and a web connecting the outer ends of the spokes, the alternate spokes of one-half respectively closely enveloping and being closely enveloped by the alternate corresponding spokes of the other half, substantially as described.

7. A pressed metal wheel composed of similar halves each including a hub portion, a peripheral web, and spokes formed integral therewith and bent to tubular form, the corresponding spokes of the two halves snugly fitting one within the other, the spokes of each half merging into semi-tubular portions of the web which have outer dimensions corresponding to that of the outer spokes, the semi-tubular terminals of the inner spokes thus presenting shoulder abutments for the enveloping ends of the outer spokes and forming a substantially flush continuation thereof, substantially as described.

8. A pressed metal wheel composed of similar halves each including a hub portion, a peripheral web, and spokes formed integral therewith and bent to tubular form, the alternate spokes of one-half being enveloped by the corresponding alternate spokes of the other half, the spokes of each half merging into semi-tubular portions of the web, the semi-tubular terminals of the inner spokes presenting shoulder abutments for the enveloping ends of the outer spokes, substantially as described.

9. A pressed metal wheel composed of similar halves each including a hub portion, a peripheral web, and spokes formed integral therewith and bent to tubular form, the alternate spokes of one-half being enveloped by the corresponding alternate spokes of the other half, the spokes of each half merging into semi-tubular portions of the web which have dimensions corresponding substantially to that of the outer spokes, the semi-tubular terminals of the inner spokes thus presenting shoulder abutments for the enveloping ends of the outer spokes and forming a substantially flush continuation thereof, substantially as described.

10. A pressed metal wheel comprising two similar halves of sheet metal each consisting of a centrally apertured disk with radial ribs, and tubular spokes extending outwardly from the disk as continuations of the ribs, the alternate tubular spokes of one-half closely fitting within the alternate corresponding spokes of the other half, the metal of the interior spokes being offset inwardly from the surface of the ribs whereby to provide a shoulder abutment for the metal of the enveloping spoke, substantially as described.

11. A pressed metal wheel comprising two similar halves of sheet metal each consisting of a centrally apertured disk with radial ribs, and tubular spokes extending outwardly from the disk as continuations of the ribs, the alternate tubular spokes of one-half closely fitting within the alternate corresponding spokes of the other half, the metal of the interior spokes being offset inwardly from the surface of the ribs to a depth corresponding substantially to the thickness of the metal whereby to provide a shoulder abutment for the metal of the enveloping spoke and to produce a substantially flush joint, substantially as described.

12. A pressed metal wheel composed of similar halves each including a hub portion and spoke members formed integral therewith and bent to tubular form, the corresponding spokes of the two halves snugly fitting one within the other, the adjacent edges of the overlying and underlying portions having an offset relation whereby to present substantially flush outer surfaces at the line of juncture, substantially as described.

13. A pressed metal wheel composed of similar halves each including a hub portion and spoke members bent to tubular form, the alternate spokes of one-half being enveloped by the corresponding alternate spokes of the other half, the meeting edges of the coöperating parts being so arranged as to present substantially flush outer surfaces, substantially as described.

14. A pressed metal wheel composed of similar halves each including a hub portion and spoke members bent to tubular form, the alternate spokes of one-half being enveloped by the corresponding alternate spokes of the other half, the inner spokes in their end portions having an outer diameter substantially equal to that of the outer spokes and offset to provide shoulders between which to receive the enveloping outer spokes and to form a substantially flush exterior surface at the line of juncture, substantially as described.

15. A pressed metal wheel composed of similar halves each including a hub portion, a peripheral web, and spokes formed integral therewith and bent to tubular form, the alternate spokes of one-half being enveloped by the corresponding alternate spokes of the other half, the spokes of each half merging at their outer ends into semi-tubular portions of the web and at their inner ends into semi-tubular ribs formed upon the hub portion, the metal of the interior spokes at the point of merger with the web and hub portion offset inwardly to a depth corresponding substantially to the thickness of the metal whereby to provide shoulders between which to receive the enveloping outer spokes and to form a substantially flush exterior surface at the line of juncture, substantially as described.

In testimony whereof I have hereunto signed my name in the presence of two subscribing witnesses.

LEWIS T. GREIST.

Witnesses:
  M. C. BROWER,
  T. D. BUTLER.